US012141045B2

(12) United States Patent
Sethi et al.

(10) Patent No.: US 12,141,045 B2
(45) Date of Patent: Nov. 12, 2024

(54) CONTROLLER FAILURE PREDICTION AND TROUBLESHOOTING

(71) Applicant: Dell Products L.P., Round Rock, TX (US)

(72) Inventors: Parminder Singh Sethi, Ludhiana (IN); Nithish Kote, Bangalore (IN); Thanuja C, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 17/982,743

(22) Filed: Nov. 8, 2022

(65) Prior Publication Data

US 2024/0152442 A1    May 9, 2024

(51) Int. Cl.
*G06F 11/00*  (2006.01)
*G06F 11/07*  (2006.01)
*G06F 11/34*  (2006.01)

(52) U.S. Cl.
CPC ...... *G06F 11/3476* (2013.01); *G06F 11/0751* (2013.01); *G06F 11/0793* (2013.01); *G06F 11/349* (2013.01); *G06F 11/0706* (2013.01)

(58) Field of Classification Search
CPC ............ G06F 11/3476; G06F 11/0751; G06F 11/093; G06F 11/2257; G06F 11/2263; G06F 18/10; G06F 18/24; G06F 40/20
See application file for complete search history.

(56) References Cited

U.S. PATENT DOCUMENTS

| | | | |
|---|---|---|---|
| 2019/0095313 A1* | 3/2019 | Xu | G06F 17/18 |
| 2022/0019935 A1* | 1/2022 | Ghatage | G06F 11/3065 |
| 2022/0358005 A1* | 11/2022 | Saha | G06F 40/216 |
| 2023/0161662 A1* | 5/2023 | Wollny | G06F 11/3476 |
| | | | 714/48 |

OTHER PUBLICATIONS

Dell Technologies, "How to Export the PERC Controller Debug Log via the BIOSRAID Controller," Article No. 000134783, https://www.dell.com/support/kbdoc/en-in/000134783/how-to-export-the-perc-controller-debug-log-via-the-bios-raid-controller, Sep. 30, 2021, 6 pages.
S. Flynn, "What is the Difference Between Test Data and Live Data?" https://opendatascience.com/what-is-the-difference-between-test-data-and-live-data/, Dec. 27, 2021, 5 pages.

* cited by examiner

*Primary Examiner* — Marc Duncan
(74) *Attorney, Agent, or Firm* — Ryan, Mason & Lewis, LLP

(57) ABSTRACT

Techniques for failure prediction of controllers are disclosed. For example, a method comprises collecting data corresponding to operation of a plurality of controllers from one or more devices, and predicting, using one or more machine learning algorithms, at least one of degradation and failure of one or more controllers of the plurality of controllers based, at least in part, on the data corresponding to the operation of the plurality of controllers. Using the one or more machine learning algorithms, one or more corrective actions to prevent the at least one of the degradation and the failure of the one or more controllers are identified. Instructions comprising the one or more corrective actions are generated and transmitted to at least one user device.

20 Claims, 11 Drawing Sheets

| LOG ENTRY | STATE |
|---|---|
| SUT not booting | Critical |
| Bad blocks detected on the server | Warning |
| PSOD issue while updating the drivers | Critical |
| RSOD issue | Critical |
| BSOD issue on windows | Critical |
| Not retrieving operational data details | Warning |
| Drive 0 is removed | Warning |
| Power Supply Unit (PSU) 1 is not receiving input power because of issues in PSU or cable connections | Critical |
| Virtual Disk 239 on RAID Controller in SL 3 has failed | Warning |
| License assigned to device iDRAC expires in 5 days | Warning |
| Login attempt alert for process dmzscan from 100.103.5.52 using SSH, IP will be blocked for 60 seconds | Warning |
| The NIC in Slot 3 Port 1 network link is down | Warning |
| Power required by the system exceeds the power supplied by the Power Supply Units (PSUs) | Critical |
| The system halted because system power exceeds capacity | Critical |
| The chassis is open while the power is on | Critical |

| Key | Checklist | Debug Traige |
|---|---|---|
| SUT not booting | CPU should be properly fixed in correct orientation. For 2P system, Mix SKU is not supported on AMD/Intel which results in no signal issue on AMD, please verify both the part numbers are same. Please follow the proper memory matrix population, if memory matrix is not properly followed system fails to boot which results in no signal issue. Check if SPI/uJBSON jumper is placed in such a way that it should boot from planar. Follow the APB's or release notes while upgrading Firmware's. Check if video cable on the planar is properly connected. Connect VGA monitor and check. | Check if all the 7 OMNAU IED's are glowing, to ensure power sequence is proper. |
| iDRAC is not accessible | If iDRAC is non responsive. Check if iDRAC H8 LED is blinking. | Check if front heart beat LED's are blinking, if not need to collect the iDRAC serial log for further debug. DIP SW - BMC_MFG_MODE, BMC_MODE_JMP and BMC_BD_UART_SEL needs to be on for iDRAC serial. |

```
import pandas
from sklearn.ensemble import RandomForestRegressor
from sklearn import model_selection
from sklearn.metrics import accuracy_score
from sklearn.preprocessing import LabelEncoder load data
data = pandas.read_csv('server_utilization.csv', header=None)
dataset = data.values
print(dataset)

# split data into X and y
X = dataset[:,0:5]
Y = dataset[:,5]

# encode string class values as integers
label_encoder = LabelEncoder()
label_encoder = label_encoder.fit(Y)
label_encoded_y = label_encoder.transform(Y)

seed = 7
test_size = 0.33
X_train, X_test, y_train, y_test = model_selection.train_test_split(X, label_encoded_y,
                                   test_size=test_size, random_state=seed)

regr = RandomForestRegressor(max_depth=2, random_state=0)
regr.fit(X_train, y_train)

# make predictions for test data
y_pred = regr.predict(X_test)
predictions = [round(value) for value in y_pred]

# evaluate predictions
accuracy = accuracy_score(y_test, predictions)
print("Accuracy: %.2f%%" % (accuracy * 100.0))
```

CONTROLLER FAILURE PREDICTION AND TROUBLESHOOTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to controller management in such information processing systems.

BACKGROUND

Storage and network controllers are instrumental in establishing reliable storage systems with data redundancy. As a result of heavy utilization due to large volumes of input-output (IO) operations, the performance of controllers may degrade over time to the point of failure. The reasons for failure or performance degradation can be captured in logs, but support teams or customers may not understand how to debug the logs and take necessary corrective actions. Additionally, degradation or failure typically occurs before any corrective action is taken.

SUMMARY

Embodiments provide a controller failure prediction platform in an information processing system.

For example, in one embodiment, a method comprises collecting data corresponding to operation of a plurality of controllers from one or more devices, and predicting, using one or more machine learning algorithms, at least one of degradation and failure of one or more controllers of the plurality of controllers based, at least in part, on the data corresponding to the operation of the plurality of controllers. Using the one or more machine learning algorithms, one or more corrective actions to prevent the at least one of the degradation and the failure of the one or more controllers are identified. Instructions comprising the one or more corrective actions are generated and transmitted to at least one user device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts a table including different log entries and their corresponding states in an illustrative embodiment.

FIG. 6 depicts a table including troubleshooting options in connection with controller failures in an illustrative embodiment.

FIG. 8 depicts example pseudocode for the operation of a data analytics and failure prediction engine in an illustrative embodiment.

DETAILED DESCRIPTION

Figure 1:
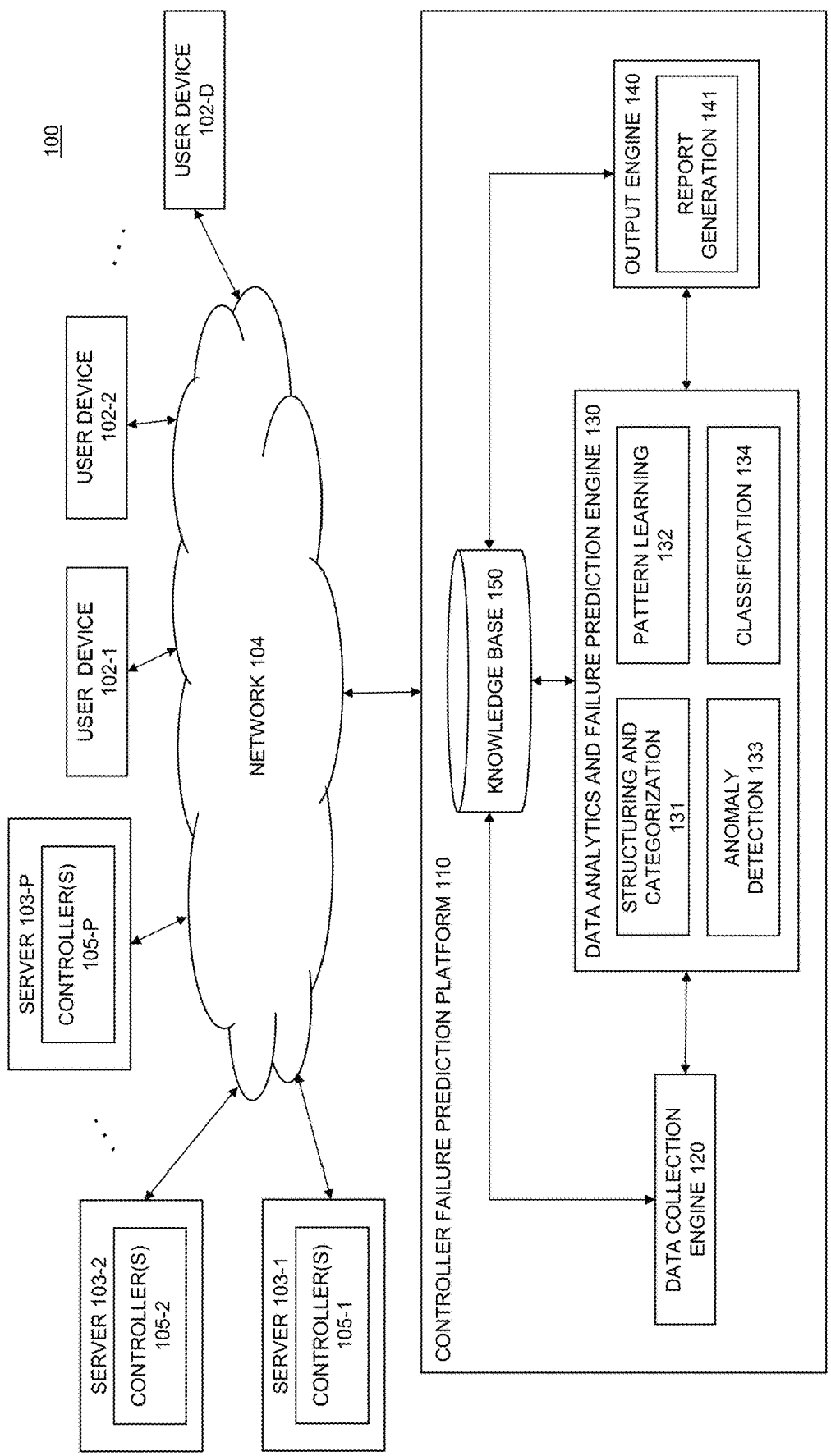
FIG. 1 depicts an information processing system with a controller failure prediction platform for predicting controller failure in an illustrative embodiment.
Figure 2:
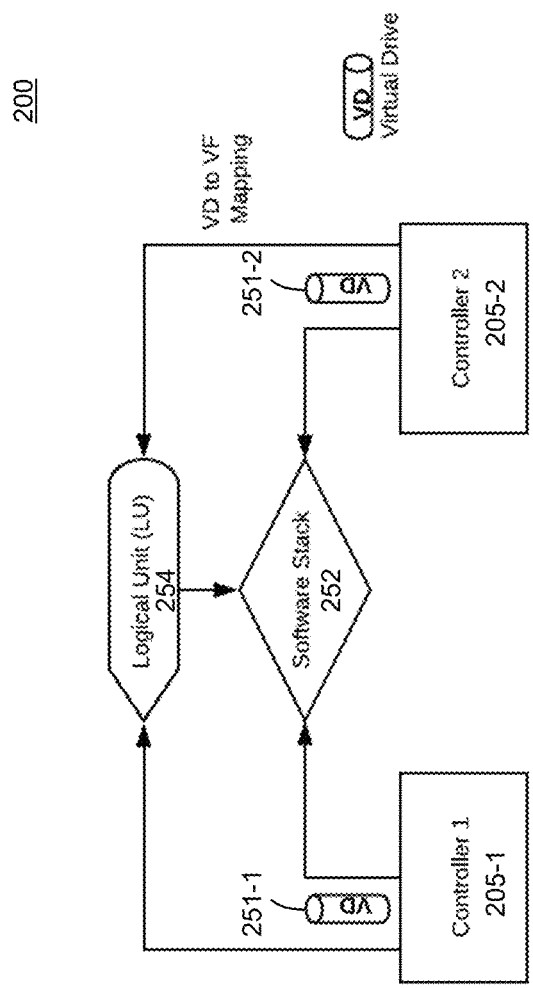
FIG. 2 depicts an operational flow for the generation of virtual drives by controllers in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "controller" is to be broadly construed, and refers to a hardware device and/or software program used for example, to manage storage devices and/or arrays, orchestrate network functions, interface with other devices and/or perform other types of functions. Some examples of controllers include, but are not necessarily limited to, storage controllers, network controllers, host bus adaptor (HBA) controllers, redundant array of independent disks (RAID) controllers, remote access controllers and corresponding cards associated therewith.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "image" is to be broadly construed to refer to a visual representation which is, for example, produced on an electronic display such as a computer screen or other screen of a device. An image as used herein may include, but is not limited to, a screen shot, window, message box, error message or other visual representation that may be produced on a device. Images can be in the form of one or more files in formats including, but not necessarily limited to, Joint Photographic Experts Group (JPEG), Portable Network Graphics (PNG), Graphics Interchange Format (GIF), and Tagged Image File (TIFF).

FIG. 1 shows an information processing system 100 configured in accordance with an illustrative embodiment. The information processing system 100 comprises user devices 102-1, 102-2, . . . 102-D (collectively "user devices 102") and servers 103-1, 103-2, . . . 103-P (collectively "servers 103"). Each of the servers 103 includes one or more controllers 105-1, 105-2, . . . , 105-P (collectively "controllers 105") The user devices 102 and servers 103 communicate over a network 104 with a controller failure prediction platform 110. The variables D and P and other similar index variables herein such as K and L are assumed to be arbitrary positive integers greater than or equal to one.

Storage and network controllers establish reliable enterprise-storage systems with data redundancy and improve performance. In a non-limiting illustrative example, referring to the operational flow 200, storage controllers 205-1 and 205-2 respectively create virtual drive (VD) 251-1 and virtual drive 251-2, which are used by the software stack 252 for redundancy purposes. The storage controllers 205-1 and 205-2 perform virtual drive to virtual function (VF) mapping for a logical unit 254. Data is distributed across the virtual drives 251-1 and 251-2 in several ways and the virtual drives 251-1 and 251-2 are used in a real-time production environment for customer applications and workloads.

The user devices 102 and servers 103 can comprise, for example, desktop, laptop or tablet computers, servers, host devices, storage devices, mobile telephones, Internet of Things (IoT) devices or other types of processing devices capable of communicating with the controller failure prediction platform 110 over the network 104. Such devices are examples of what are more generally referred to herein as "processing devices." Some of these processing devices are also generally referred to herein as "computers." The user devices 102 and servers 103 may also or alternately comprise virtualized computing resources, such as virtual machines (VMs), containers, etc. The user devices 102 and/or servers 103 in some embodiments comprise respective computers associated with a particular company, organization or other enterprise. It is to be understood that although the embodiments are discussed in terms of user devices 102 (e.g., customer or client devices) and servers 103, the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities. Controller failure prediction services may be provided for users utilizing one or more machine learning models, although it is to be appreciated that other types of infrastructure arrangements could be used. At least a portion of the available services and functionalities provided by the controller failure prediction platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the controller failure prediction platform 110, as well as to support communication between the controller failure prediction platform 110 and connected devices (e.g., user devices 102 and servers 103) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the controller failure prediction platform 110.

As noted above, the performance of controllers may degrade over time to the point of failure, and the reasons for failure or performance degradation may be captured in logs. However, support teams or customers may have little or no understanding how to debug the logs and take necessary corrective actions. Moreover, with conventional approaches, degradation or failure typically occurs before any corrective action is taken.

In an effort to address the above technical problems, illustrative embodiments use machine learning techniques to predict controller issues prior to controller failure and to alert users with proposed corrective actions to avoid failure. Advantageously, live and historical controller operational data including, for example, system information, storage logs, operating system (OS) and application data and debug logs is collected and analyzed using one or more machine learning algorithms. The machine learning algorithms(s) predict which controllers may fail and output comprehensive details regarding the root cause of controller issues, and solutions for troubleshooting the issues. As used herein, "live data" refers to, for example, data corresponding to current (e.g., real-time) use of a device, system and/or component (e.g., controller), and "historical data" refers to, for example, data corresponding to past use of a device, system and/or component.

The controller failure prediction platform 110 in the present embodiment is assumed to be accessible to the user devices 102 and servers 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the controller failure prediction platform 110 includes a data collection engine 120, a data analytics and failure prediction engine 130, an output engine 140 and a knowledge base 150. The data analytics and failure prediction engine 130 comprises a structuring and categorization layer 131, a pattern learning layer 132, an anomaly detection layer 133 and a classification layer 134. The output engine 140 comprises a report generation layer 141.

Figure 3:
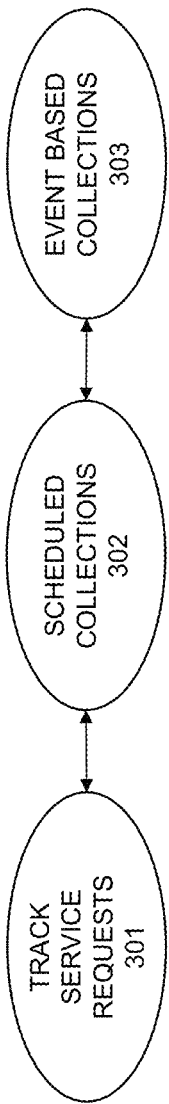
FIG. 3 depicts different types of data collection in an illustrative embodiment.

The data collection engine 120 collects operational data corresponding to the operation of the controllers 105 and of other server components from servers 103. The data can be collected using one or more data collection applications such as, but not necessarily limited to, SupportAssist Enterprise available from Dell Technologies. Referring to FIG. 3, the data collection engine 120 collects operational data from the servers by tracking service requests 301, through scheduled collections 302 at designated times and/or through event-based collections 303. For example, when service requests for repair or other issues corresponding to given ones of the servers 103 are initiated, the data collection engine 120 processes the service requests and collects operational data associated with the subject server and/or components (e.g., controllers 105) identified in the service request. Scheduled collections 302 occur at pre-defined times or intervals specified by, for example, a user via one or more user devices 102 or automatically scheduled by the data collection engine 120. Event-based collections 303 are triggered by one or more events such as, but necessarily limited to, component (e.g., controller 105) failure, a detected degradation of performance of a component, installation of new software or firmware, the occurrence of certain operations, etc. In some embodiments, an integrated Dell® remote access controller (iDRAC) causes the data collection engine 120 to collect operational data from one or more servers 103 and export the collected operational data to a location (e.g., database or cache) on the controller failure prediction platform 110 or to a shared network location (e.g., centralized database). In some embodiments, the operational data is stored in a portion of the knowledge base 150. In some embodiments, in connection with the event-based collections 303, the data collection engine 120 evaluates the health of servers 103, and of storage and networking devices for changes in performance metrics (e.g., decreases in input-output operations per second (IOPS) and throughput, increases in latency, etc.) to eliminate downtime before it occurs. Operational data may be automatically collected by the data collection engine 120 responsive to one or more service requests and/or events, and through scheduled collections 302.

Figure 4:
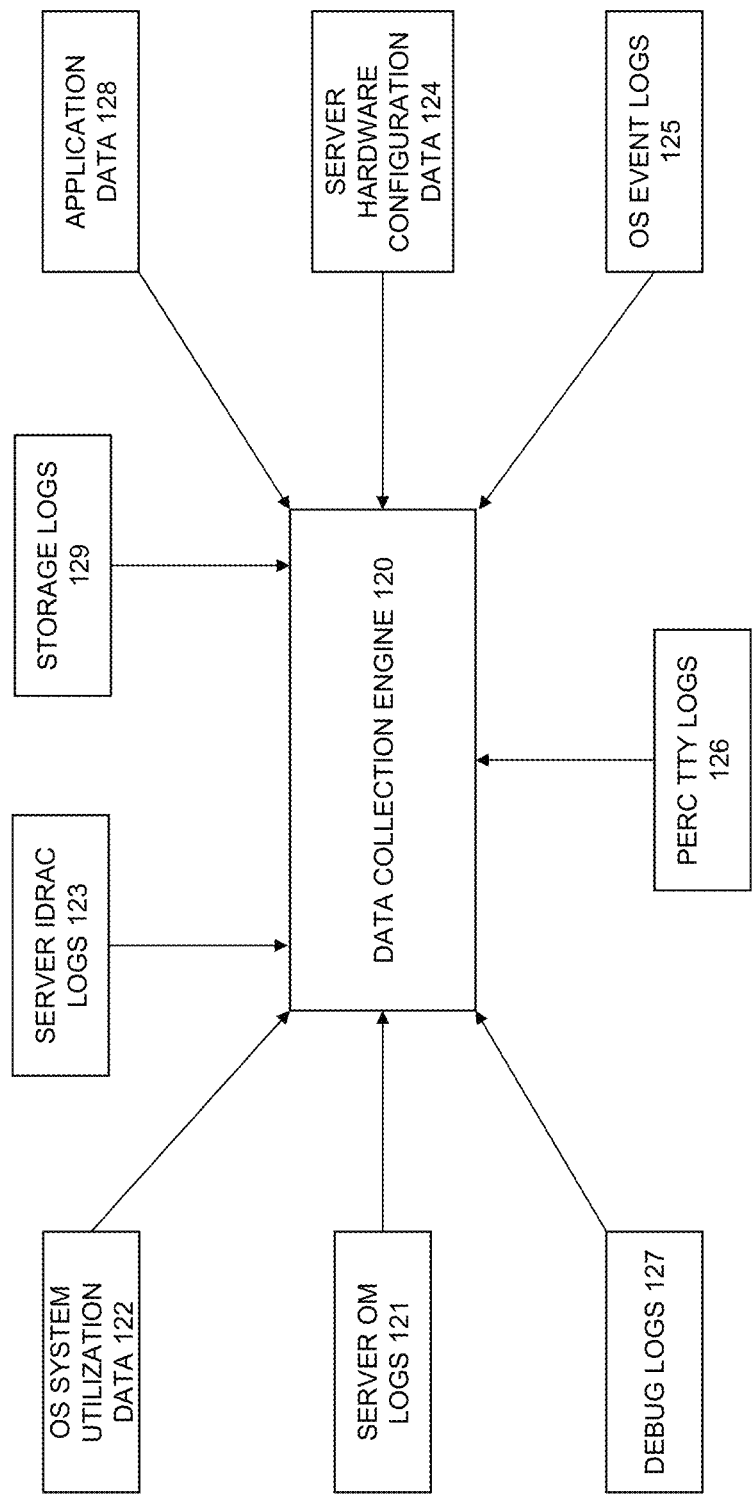
FIG. 4 depicts different types of data collected by a data collection engine in an illustrative embodiment.

Referring to FIG. 4, the operational data collected by the data collection engine 120 includes, but is not necessarily limited to, server OpenManage (OM) logs 121, operating system (OS) utilization data 122, server iDRAC logs 123, server hardware configuration data 124, OS event logs 125, PowerEdge™ RAID Controller (PERC TTY) logs 126, debug logs 127, application data 128 and storage logs 129. The data collection engine 120 collects live and historical data, which includes, for example, system information, storage logs, OS and application data, basic input-output system (BIOS) serial logs and debug logs. The BIOS serial logs can be collected using secure shell (SSH) protocol.

Some example log entries prior to failure of a controller 105 include reference to, for example, an error-correcting code (ECC), controller reset, aborted operations, failure of a highly available sync pool, a triggered watchdog, crashes, failure of background initialization (BGI), a corrupted consistency check (CC), request time outs, network bounces, etc. Other example log entries, which may be related to controller failure, specify, for example, out of memory, network table full-dropping packet, call traces, unsupported bits, etc. Some of the references may be extracted from error messages. As explained in more detail herein, reasons for controller failure may be detectable in clusters of log instances (e.g., errors, exceptions, critical log entries, etc.) across multiple logs.

The data collected from the data collection engine 120 is input to the data analytics and failure prediction engine 130 and to the knowledge base 150. The data, which includes real-time data, is collected and monitored periodically for decision making and maintains information about the servers 103 in a centralized location (e.g., knowledge base 150). The knowledge base 150 improves decision-making, problem-solving and triaging of data.

The data analytics and failure prediction engine 130 is an intelligent module used to supply comprehensive insight into the root cause of issues, and provides solutions for troubleshooting the issues. Using one or more machine learning algorithms (e.g., a random forest machine learning algorithm), the classification layer 134 of the data analytics and failure prediction engine 130 predicts degradation and/or failure of one or more controllers 105 based at least in part on the operational data corresponding to the operation of the controllers 105 collected by the data collection engine 120. Using the one or more machine learning algorithms, the classification layer 134 identifies one or more corrective actions (e.g., troubleshooting actions) to prevent the degradation and/or failure of the one or more controllers 105. A report generation layer 141 of the output engine 140 generates instructions comprising the one or more corrective actions, and causes transmission of the instructions to one or more user devices 102 over network 104.

In illustrative embodiments, the data corresponding to the operation of the controllers 105 collected by the data collection engine 120 comprises historical data and live data. The one or more machine learning algorithms are trained with at least a portion of the historical data. For example, the historical data comprises a plurality of logged events which resulted in failure or degradation of one or more of the controllers 105. As a result of the training, based on similarities with the logged events in the training data, the classification layer 134 is configured to predict which incoming logged events in the live data are likely to result in failure or degradation of the controllers 105. For example, the classification layer 134 analyzes log entries to classify the log entries as critical (e.g., relating to imminent failure and/or degradation of a controller 105), warnings (e.g., relating to failure and/or degradation of a controller 105, but not imminent failure or degradation), and informational (e.g., less likely to relate to or not relating failure and/or degradation of a controller 105). FIG. 5 depicts a table 500 including different log entries and their corresponding states that may be classified by the data analytics and failure prediction engine 130.

Figure 7B:
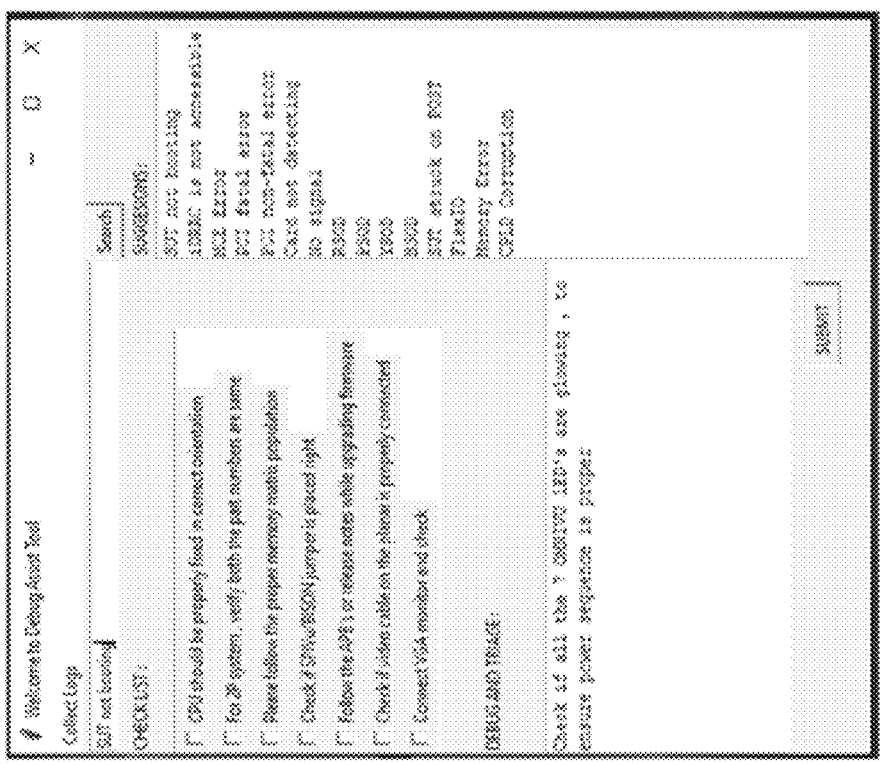
FIGS. 7A and 7B depict screenshots of troubleshooting options in connection with controller failures that may be displayed on a user device in an illustrative embodiment.
Figure 7A:
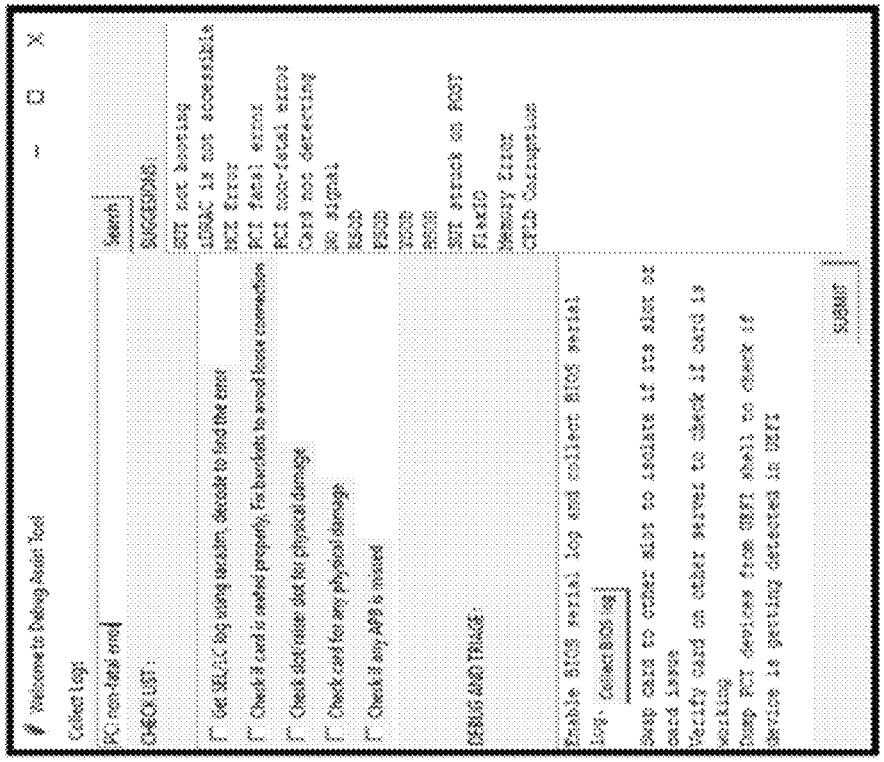

In some scenarios, the historical data includes logged events identifying steps that were taken and resulted in resolution of one or more issues with the controllers 105. As a result of the training, based on similarities with the logged events in the training data, the classification layer 134 is configured to identify corrective actions that can be taken for incoming logged events in the live data. The identified corrective actions are based on the resolution steps taken for the similar logged events in the training data. FIG. 6 depicts a table 600 including troubleshooting options (e.g., corrective actions) in connection with controller failures. Similarly, FIGS. 7A and 7B depict screenshots 701 and 702 of troubleshooting options in connection with controller failures that may be displayed on a user device 102. As can be seen in FIGS. 6, 7A and 7B, a problem (e.g., SUT not booting, iDRAC is not accessible, peripheral component interconnect (PCI) non-fatal error) is identified along with a checklist of corrective actions to be taken to resolve the issue and prevent component degradation and/or failure. In the case of screenshots 701 and 702, the problem is identified following a search for the issue, and can be selected from suggested issues based on the search terms. According to one or more embodiments, the search terms, which are entered via an interface on a user device 102 (e.g., an interface like that shown in FIGS. 7A and 7B), are input to the data analytics and failure prediction engine 130. Based on the search terms, the classification layer 134, using the one or machine learning algorithms in combination with NLP/NLU techniques, identifies the issue and corrective actions to be taken to resolve the issue. The report generation layer 141 generates instructions comprising the corrective actions, which can be displayed for a user on a user device 102 in the formats shown in screenshots 701 and 702.

In illustrative embodiments, the data corresponding to the operation of the controllers 105 comprises unstructured data, which is structured and categorized by the structuring and categorization layer 131. In a non-limiting illustrative example, the structuring and categorization layer 131 uses a random forest algorithm to categorize issues in the operational data. The structuring and categorization layer 131 further utilizes image analysis, NLP and/or NLU techniques to categorize the data. In more detail, since logs comprise textual data, NLP and/or NLU techniques are used to identify key terms and/or phrases in the logged entries. In some embodiments, text and semantics are extracted from a log image. In order to parse through unstructured text, the embodiments utilize a combination of a mask region-based convolutional neural network (Mask-R-CNN) algorithm with optical character recognition (OCR), which accomplishes object detection, text object segmentation and text extraction for an image.

According to illustrative embodiments, a pattern learning layer 132 of the data analytics and failure prediction engine 130 analyzes the operational data (e.g., the log entries) to identify patterns in the operational data corresponding to changes in one or more performance metrics of the controllers 105 or other components of the servers 103. For example, the pattern learning layer 132 analyzes each log entry to determine patterns for performance metric changes for each log entry or group of log entries. In some cases, certain individual log entries or groups of log entries may correspond to, for example, patterns of reduced IOPS (e.g., read and/or write operations per second), reduced throughput and/or increased latency. The patterns may be learned during training with the historical data, and recognized by the machine learning algorithms in log entries for the live data. Such patterns of, for example, reduced IOPS, reduced throughput and/or increased latency, and their corresponding log entries are correlated by the classification layer 134 to predict instances of possible failure and/or degradation of one or more controllers 105 or other server components.

According to illustrative embodiments, an anomaly detection layer 133 of the data analytics and failure prediction engine 130 analyzes the operational data (e.g., the log entries) to identify anomalous events in at least a portion of the log entries, and to identify common anomalous events in multiple ones of the plurality of log entries. To detect anomalous events, the anomaly detection layer 133 is trained with historical operational data collected from the data collection engine 120 to learn which logged events depict normal operation of the controllers 105 or other components. The anomaly detection layer 133 uses an unsupervised learning approach to detect anomalies in operations. Normal operations with respect to particular attributes (e.g., performance metrics) are learned from historical operations data (e.g., historical log entries). Anomaly detection or outlier detection identifies situations that are not considered normal based on the observation of the properties being considered. For example, according to illustrative embodiments, the anomaly detection layer 133 identifies clusters of normal operations across multiple log entries where performance metrics (e.g., IOPS, throughput, latency) are at certain levels and/or where messages indicate normal operation and/or a lack of errors. During anomalous situations, the performance metrics vary from the normal ranges, and/or there are messages indicating operational issues and/or errors. According to illustrative embodiments, the anomaly detection layer 133 identifies clusters of anomalous operations across multiple log entries where operations deviate from what has been concluded to be normal states.

The machine learning models used by the anomaly detection layer 133 leverage an unsupervised learning methodology for outlier detection of logged events. The unsupervised learning methodology may utilize, for example, shallow or deep learning. In an embodiment, the machine learning models implement multivariate anomaly detection using an isolation forest algorithm, which does not require labeled training data. The isolation forest algorithm identifies anomalies among the normal observations, by setting up a threshold value in a contamination parameter that can apply for real-time predictions. The isolation forest algorithm has the capacity to scale up to handle extremely large data sizes (e.g., terabytes) and high-dimensional problems with a large number of attributes, some of which may be irrelevant and potential noise. In illustrative embodiments, the machine learning model used by the anomaly detection layer 133 isolates an anomaly by creating decision trees over random attributes. This random partitioning produces significantly shorter paths since fewer instances of anomalies result in smaller partitions, and distinguishable attribute values are more likely to be separated in early partitioning. As a result, when a group (e.g., forest) of random trees collectively produces shorter path lengths for some particular points, then they are highly likely to be anomalies. A larger number of splits are required to isolate a normal point, while an anomaly can be isolated by a shorter number of splits.

According to illustrative embodiments, the structuring and categorization layer 131 extracts and decodes one or more error signatures from at least a portion of the plurality of log entries, and identifies one or more devices corresponding to the controllers 105 that may appear in the log entries. For example, the structuring and categorization layer 131 extracts and decodes error signatures from lifecycle controller/system event logs (LC/SEL) and the report generation layer 141 includes such signatures in reports generated for users. PCIe device identification may be included in logs where device slot numbers are identified.

In some embodiments, if any of the controllers 105 are predicted to fail or degrade, the classification layer 134 may recommend card replacement or other corrective actions in instructions generated by the report generation layer 141. Additional output by the classification layer 134 identifies the root cause of possible failure or degradation along with debugging and triage data and checklists for performing debugging.

FIG. 8 depicts example pseudocode 800 for the operation of the data analytics and failure prediction engine 130. The pseudocode 800 includes directives for importation of libraries used to implement the data analytics and failure prediction engine 130. For example, sklearn and Pandas libraries can be used. Illustrative embodiments implement classification using a random forest regressor. The pseudocode 800 also includes directives for splitting data into test and training data. Before building the model, the collected operational data is divided into training data and test data. In some embodiments, the historical data is divided into training and testing datasets. Alternatively, a combination of the historical and live data is divided into training and testing datasets. Once the model is trained, it is used to analyze critical logs over the testing data to identify if there is any expected criticality. According to illustrative embodiments, the training dataset is used for training the machine learning model(s) while the test set is used for testing/validating and computing accuracy score(s) of the model(s). In some embodiments, a training set will contain 80% of the operational data, while a testing set will contain 20% of the operational data. The pseudocode 800 further includes directives for creating a random forest with a specified number of decision trees, training the machine learning model and testing the machine learning model to determine its accuracy.

According to one or more embodiments, the knowledge base 150 and other data repositories or databases referred to herein can be configured according to a relational database management system (RDBMS) (e.g., PostgreSQL). In some embodiments, the knowledge base 150 and other data repositories or databases referred to herein are implemented using one or more storage systems or devices associated with the controller failure prediction platform 110. In some embodiments, one or more of the storage systems utilized to implement the knowledge base 150 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the controller failure prediction platform 110, the data collection engine 120, data analytics and failure prediction engine 130, output engine 140 and/or knowledge base 150 in other embodiments can be implemented at least in part externally to the controller failure prediction platform 110, for example, as stand-alone servers, sets of servers or other types of systems coupled to the network 104. For example, the data collection engine 120, data analytics and failure prediction engine 130, output engine 140 and/or knowledge base 150 may be provided as cloud services accessible by the controller failure prediction platform 110.

The data collection engine 120, data analytics and failure prediction engine 130, output engine 140 and/or knowledge base 150 in the FIG. 1 embodiment are each assumed to be implemented using at least one processing device. Each such processing device generally comprises at least one processor and an associated memory, and implements one or more functional modules for controlling certain features of the data collection engine 120, data analytics and failure prediction engine 130, output engine 140 and/or knowledge base 150.

At least portions of the controller failure prediction platform 110 and the elements thereof may be implemented at least in part in the form of software that is stored in memory and executed by a processor. The controller failure prediction platform 110 and the elements thereof comprise further hardware and software required for running the controller failure prediction platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, data analytics and failure prediction engine 130, output engine 140, knowledge base 150 and other elements of the controller failure prediction platform 110 in the present embodiment are shown as part of the controller failure prediction platform 110, at least a portion of the data collection engine 120, data analytics and failure prediction engine 130, output engine 140, knowledge base 150 and other elements of the controller failure prediction platform 110 in other embodiments may be implemented on one or more other processing platforms that are accessible to the controller failure prediction platform 110 over one or more networks. Such elements can each be implemented at least in part within another system element or at least in part utilizing one or more stand-alone elements coupled to the network 104.

It is assumed that the controller failure prediction platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, data analytics and failure prediction engine 130, output engine 140, knowledge base 150 and other elements of the controller failure prediction platform 110, and the elements thereof can each be implemented in the form of one or more LXCs running on one or more VMs. Other arrangements of one or more processing devices of a processing platform can be used to implement the data collection engine 120, data analytics and failure prediction engine 130, output engine 140 and knowledge base 150, as well as other elements of the controller failure prediction platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the controller failure prediction platform 110 to reside in different data centers. Numerous other distributed implementations of the controller failure prediction platform 110 are possible.

Accordingly, one or each of the data collection engine 120, data analytics and failure prediction engine 130, output engine 140, knowledge base 150 and other elements of the controller failure prediction platform 110 can each be implemented in a distributed manner so as to comprise a plurality of distributed elements implemented on respective ones of a plurality of compute nodes of the controller failure prediction platform 110.

It is to be appreciated that these and other features of illustrative embodiments are presented by way of example only, and should not be construed as limiting in any way. Accordingly, different numbers, types and arrangements of system elements such as the data collection engine 120, data analytics and failure prediction engine 130, output engine 140, knowledge base 150 and other elements of the controller failure prediction platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the controller failure prediction platform can be offered to cloud infrastructure customers or other users as part of FaaS, CaaS and/or PaaS offerings.

Figure 9:
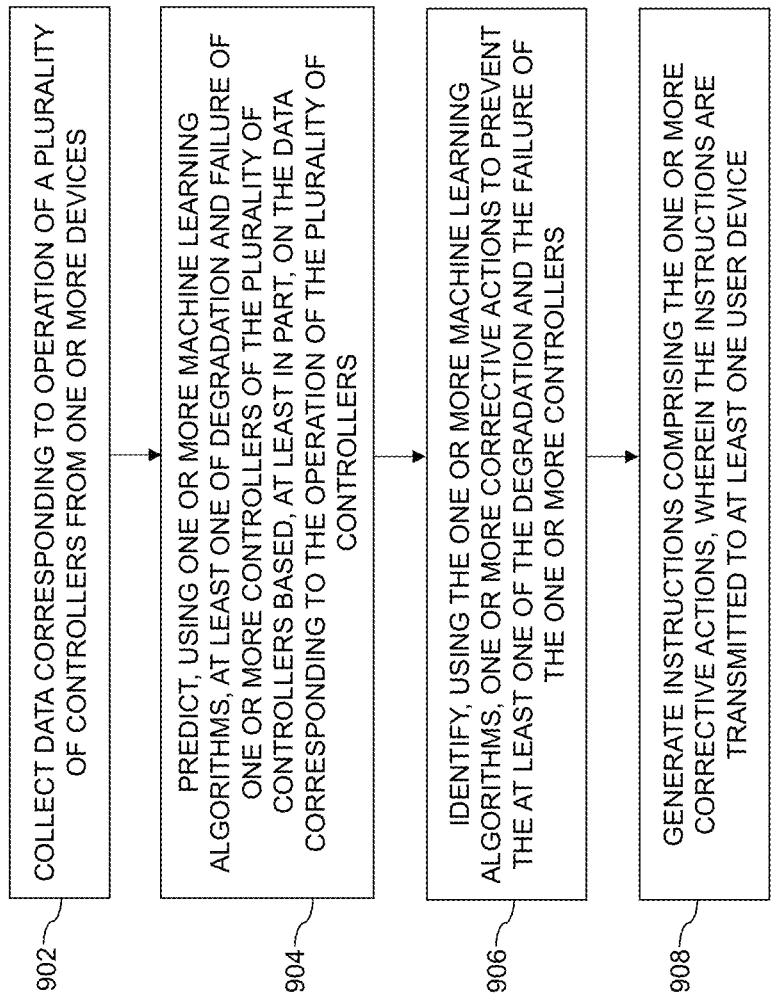
FIG. 9 depicts a process for controller failure prediction according to an illustrative embodiment.

The operation of the information processing system 100 will now be described in further detail with reference to the flow diagram of FIG. 9. With reference to FIG. 9, a process 900 for controller failure prediction as shown includes steps 902 through 908, and is suitable for use in the system 100 but is more generally applicable to other types of information processing systems comprising a controller failure prediction platform configured for controller failure prediction.

In step 902, data corresponding to operation of a plurality of controllers is collected from one or more devices. The plurality of controllers comprise, for example, a storage controller, a network controller and/or a host bus adaptor controller. In step 904, using one or more machine learning algorithms, at least one of degradation and failure of one or more controllers of the plurality of controllers is predicted based, at least in part, on the data corresponding to the operation of the plurality of controllers.

In step 906, using the one or more machine learning algorithms, one or more corrective actions to prevent the at least one of the degradation and the failure of the one or more controllers are identified. In step 908, instructions comprising the one or more corrective actions are generated. The instructions are transmitted to at least one user device. The one or more machine learning algorithms comprise, for example, a random forest machine learning algorithm.

The data corresponding to the operation of the plurality of controllers comprises unstructured data, which is structured and categorized. The data corresponding to the operation of the plurality of controllers comprises historical data and live data. The one or more machine learning algorithms are trained with at least a portion of the historical data. The predicting of the at least one of the degradation and the failure of the one or more controllers is based, at least in part, on at least a portion of the live data.

In illustrative embodiments, the data corresponding to the operation of the plurality of controllers comprises a plurality of log entries, and the predicting comprises analyzing the plurality of log entries to classify one or more of the plurality of log entries as critical. The analyzing of the plurality of log entries comprises identifying one or more patterns in at least a portion of the plurality of log entries corresponding to changes in one or more performance metrics of at least a portion of the plurality of controllers. The one or more performance metrics comprise, for example, IOPS, throughput and/or latency. In some embodiments, the predicting comprises analyzing the plurality of log entries using NLP and/or image analysis.

The analyzing of the plurality of log entries also comprises identifying one or more anomalous events in at least a portion of the plurality of log entries, and identifying common anomalous events of the one or more anomalous events in multiple ones of the plurality of log entries. The analyzing of the plurality of log entries further comprises extracting and decoding one or more error signatures from at least a portion of the plurality of log entries, and identifying one or more devices corresponding to at least a portion of the plurality of controllers.

It is to be appreciated that the FIG. 9 process and other features and functionality described above can be adapted for use with other types of information systems configured to execute controller failure prediction services in a controller failure prediction platform or other type of platform.

The particular processing operations and other system functionality described in conjunction with the flow diagram of FIG. 9 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a controller failure prediction platform as disclosed herein can provide a number of significant advantages relative to conventional arrangements. For example, the controller failure prediction platform effectively uses machine learning techniques to predict controller failure and/or performance degradation, which may lead to failure (e.g., the controller ceasing to operate). As an additional advantage, the embodiments provide techniques for parsing and triaging unstructured logs from the different sources (e.g., SupportAssist, CloudIQ, etc.) and generating troubleshooting checklists to correct identified critical component issues. As a result, the embodiments enable more efficient use of compute resources, improve performance and reduce bottlenecks. For example, even though logs may be voluminous, the machine learning techniques implemented by the embodiments enable immediate (e.g., real-time) identification of issues in response to receipt of operational data.

The embodiments advantageously use machine learning algorithms to evaluate the operational data to predict controller issues. Unlike conventional techniques, the embodiments provide a framework for proactively predicting and alerting users of upcoming controller failures by analyzing current states in operational logs and co-relating the current states with parsed unstructured operational data. As an additional advantage, unlike current approaches, the embodiments provide comprehensive insight into the root cause of issues and an interface through which users can perform troubleshooting of issues based on provided checklists and instructions including recommended corrective actions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the controller failure prediction platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a controller failure prediction platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
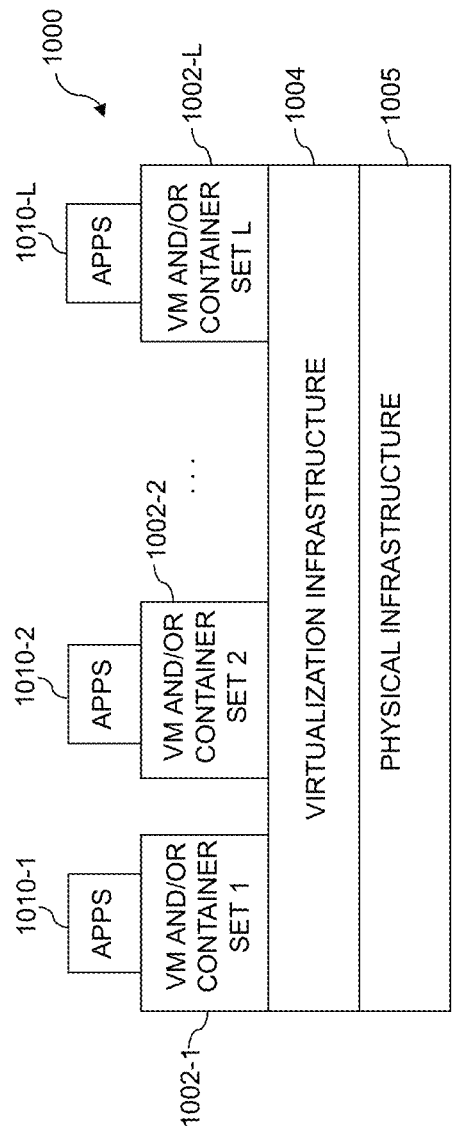
FIGS. 10 and 11 show examples of processing platforms that may be utilized to implement at least a portion of an information processing system according to illustrative embodiments.
Figure 11:
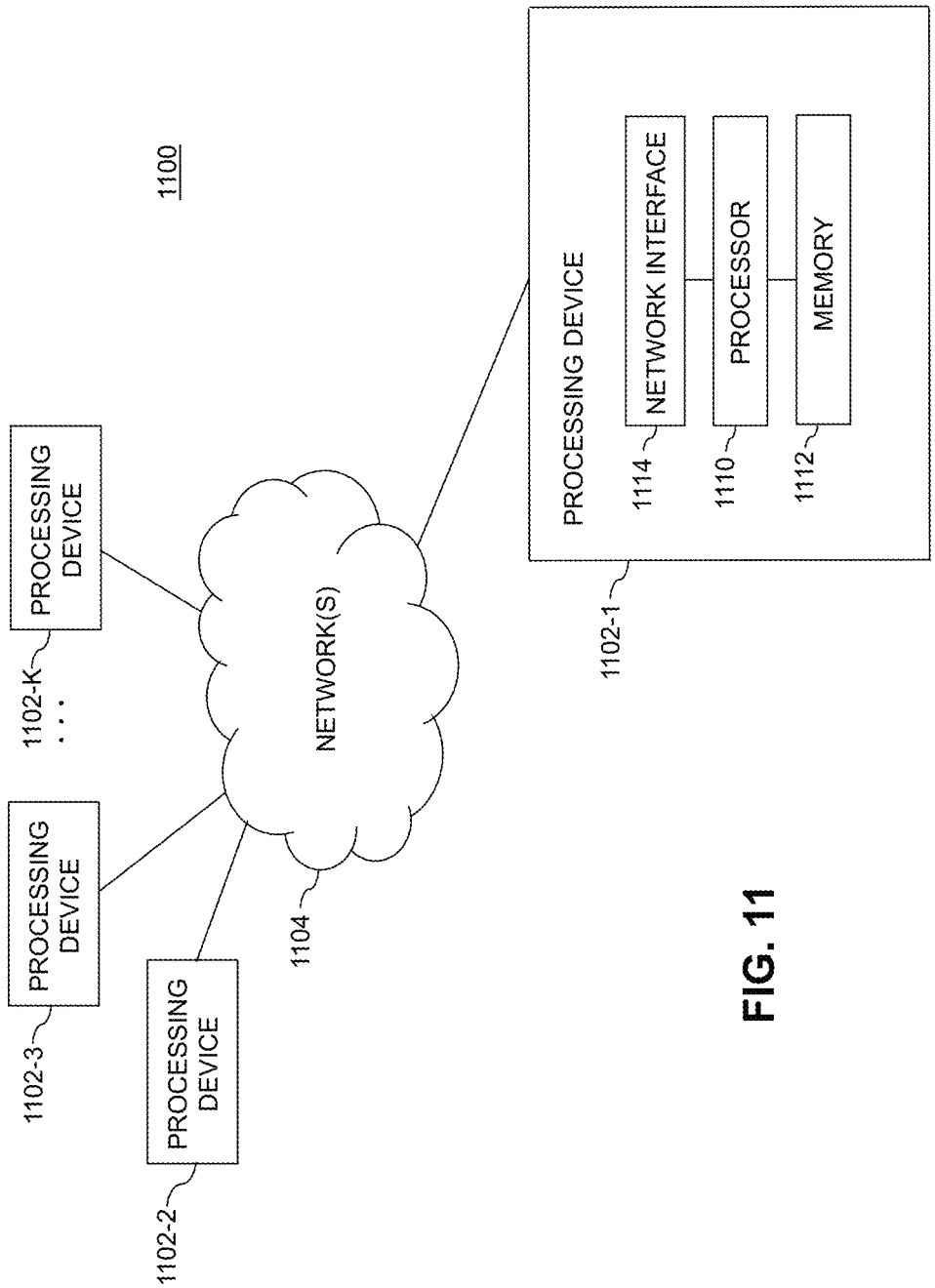

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the controller failure prediction platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and controller failure prediction platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    collecting data corresponding to operation of a plurality of controllers from one or more devices;
    predicting, using one or more machine learning algorithms, at least one of degradation and failure of one or more controllers of the plurality of controllers based, at least in part, on the data corresponding to the operation of the plurality of controllers;
    identifying, using the one or more machine learning algorithms, one or more corrective actions to prevent the at least one of the degradation and the failure of the one or more controllers;
    generating instructions comprising the one or more corrective actions, wherein the instructions are transmitted to at least one user device;
    wherein the data corresponding to the operation of the plurality of controllers comprises historical data and live data;

wherein the one or more machine learning algorithms are trained with at least a portion of the historical data;
wherein the predicting comprises classifying at least a portion of the data corresponding to the operation of the plurality of controllers as critical, the classifying comprising using the one or more machine learning algorithms to identify one or more patterns for performance metric changes reaching a criticality level; and
validating an accuracy of the one or more machine learning algorithms by testing the one or more machine learning algorithms with testing data comprising a subset of the historical data and a subset of the live data;
wherein the steps of the method are executed by a processing device operatively coupled to a memory.

2. The method of claim 1 wherein:
the data corresponding to the operation of the plurality of controllers comprises unstructured data; and
the method further comprises structuring and categorizing the unstructured data.

3. The method of claim 1 wherein the predicting is based, at least in part, on at least a portion of the live data.

4. The method of claim 1 wherein the plurality of controllers comprise at least one of a storage controller, a network controller and a host bus adaptor controller.

5. The method of claim 1 wherein:
the data corresponding to the operation of the plurality of controllers comprises a plurality of log entries; and
the predicting further comprises analyzing the plurality of log entries to classify one or more of the plurality of log entries as critical.

6. The method of claim 5 wherein the analyzing of the plurality of log entries comprises identifying the one or more patterns for performance metric changes in at least a portion of the plurality of log entries, wherein the one or more patterns for performance metric changes correspond to changes in one or more performance metrics of at least a portion of the plurality of controllers.

7. The method of claim 6 wherein the one or more performance metrics comprise at least one of input-output operations per second (IOPS), throughput and latency.

8. The method of claim 5 wherein the analyzing of the plurality of log entries comprises identifying one or more anomalous events in at least a portion of the plurality of log entries.

9. The method of claim 8 wherein the analyzing of the plurality of log entries further comprises identifying common anomalous events of the one or more anomalous events in multiple ones of the plurality of log entries.

10. The method of claim 5 wherein the analyzing of the plurality of log entries comprises extracting and decoding one or more error signatures from at least a portion of the plurality of log entries.

11. The method of claim 5 wherein the analyzing of the plurality of log entries comprises identifying one or more devices corresponding to at least a portion of the plurality of controllers.

12. The method of claim 1 wherein the one or more machine learning algorithms comprise a random forest machine learning algorithm.

13. The method of claim 1 wherein:
the data corresponding to the operation of the plurality of controllers comprises a plurality of log entries; and
the predicting comprises analyzing the plurality of log entries using at least one of natural language processing and image analysis.

14. An apparatus comprising:
a processing device operatively coupled to a memory and configured:
to collect data corresponding to operation of a plurality of controllers from one or more devices;
to predict, using one or more machine learning algorithms, at least one of degradation and failure of one or more controllers of the plurality of controllers based, at least in part, on the data corresponding to the operation of the plurality of controllers;
to identify, using the one or more machine learning algorithms, one or more corrective actions to prevent the at least one of the degradation and the failure of the one or more controllers;
to generate instructions comprising the one or more corrective actions, wherein the instructions are transmitted to at least one user device;
wherein the data corresponding to the operation of the plurality of controllers comprises historical data and live data;
wherein the one or more machine learning algorithms are trained with at least a portion of the historical data;
wherein the predicting comprises classifying at least a portion of the data corresponding to the operation of the plurality of controllers as critical, the classifying comprising using the one or more machine learning algorithms to identify one or more patterns for performance metric changes reaching a criticality level; and
to validate an accuracy of the one or more machine learning algorithms by testing the one or more machine learning algorithms with testing data comprising a subset of the historical data and a subset of the live data.

15. The apparatus of claim 14 wherein:
the data corresponding to the operation of the plurality of controllers comprises a plurality of log entries; and
in predicting, the processing device is further configured to analyze the plurality of log entries to classify one or more of the plurality of log entries as critical.

16. The apparatus of claim 15 wherein, in analyzing of the plurality of log entries, the processing device is configured to identify the one or more patterns for performance metric changes in at least a portion of the plurality of log entries, wherein the one or more patterns for performance metric changes correspond to changes in one or more performance metrics of at least a portion of the plurality of controllers.

17. The apparatus of claim 16 wherein the one or more performance metrics comprise at least one of input-output operations per second (IOPS), throughput and latency.

18. An article of manufacture comprising a non-transitory processor-readable storage medium having stored therein program code of one or more software programs, wherein the program code when executed by at least one processing device causes said at least one processing device to perform the steps of:
collecting data corresponding to operation of a plurality of controllers from one or more devices;
predicting, using one or more machine learning algorithms, at least one of degradation and failure of one or more controllers of the plurality of controllers based, at least in part, on the data corresponding to the operation of the plurality of controllers;
identifying, using the one or more machine learning algorithms, one or more corrective actions to prevent the at least one of the degradation and the failure of the one or more controllers;
generating instructions comprising the one or more corrective actions, wherein the instructions are transmitted to at least one user device;

wherein the data corresponding to the operation of the plurality of controllers comprises historical data and live data;

wherein the one or more machine learning algorithms are trained with at least a portion of the historical data;

wherein the predicting comprises classifying at least a portion of the data corresponding to the operation of the plurality of controllers as critical, the classifying comprising using the one or more machine learning algorithms to identify one or more patterns for performance metric changes reaching a criticality level; and validating an accuracy of the one or more machine learning algorithms by testing the one or more machine learning algorithms with testing data comprising a subset of the historical data and a subset of the live data.

19. The article of manufacture of claim 18 wherein:

the data corresponding to the operation of the plurality of controllers comprises a plurality of log entries; and in predicting, the program code further causes said at least one processing device to analyze the plurality of log entries to classify one or more of the plurality of log entries as critical.

20. The article of manufacture of claim 19 wherein, in analyzing of the plurality of log entries, the program code causes said at least one processing device to identify the one or more patterns for performance metric changes in at least a portion of the plurality of log entries, wherein the one or more patterns for performance metric changes correspond to changes in one or more performance metrics of at least a portion of the plurality of controllers.

* * * * *